April 7, 1931. L. A. RIDDELL 1,799,249
BREAD SLICING MACHINE
Filed Jan. 10, 1929 2 Sheets-Sheet 1
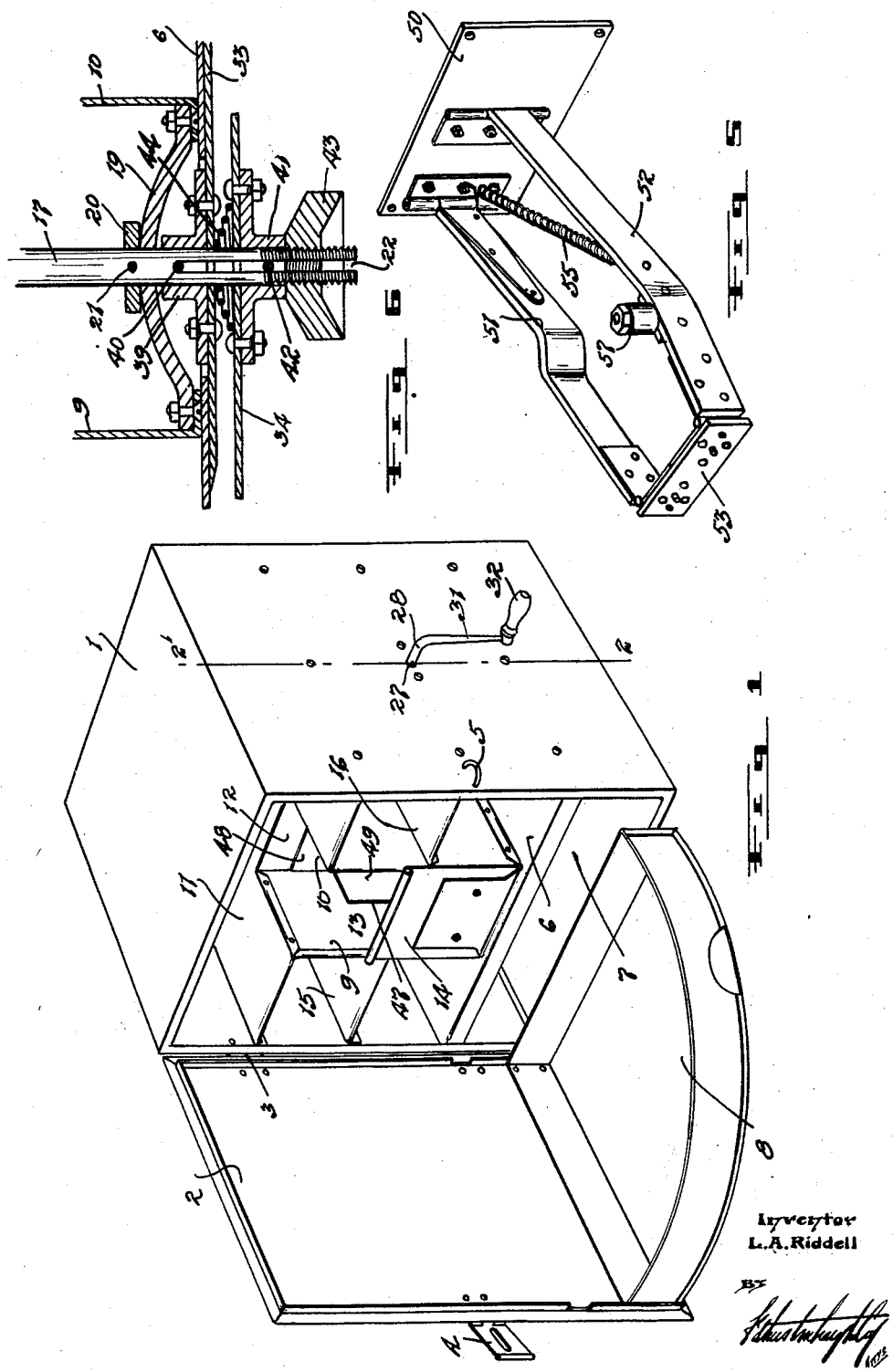
Inventor
L. A. Riddell

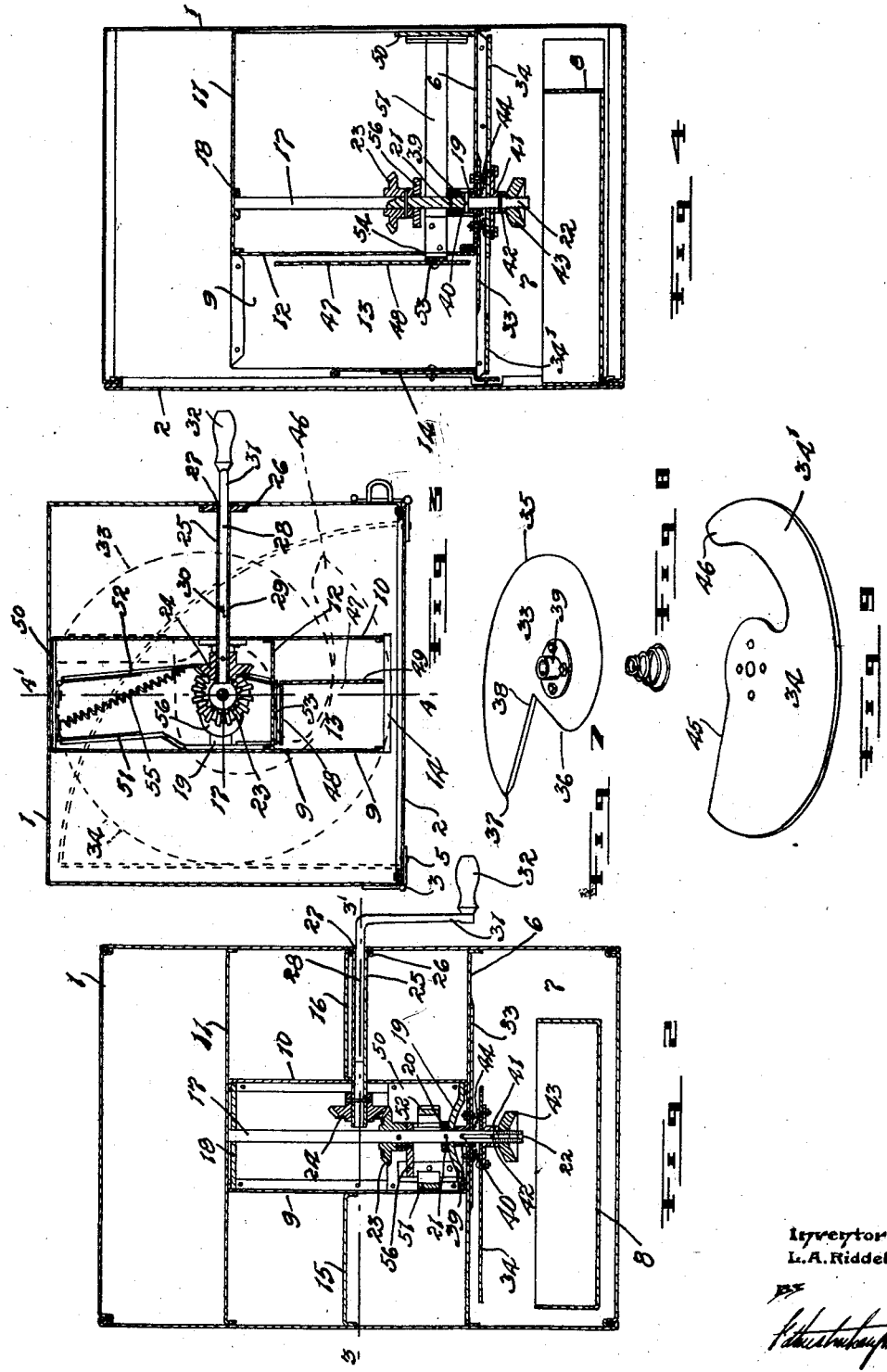

Patented Apr. 7, 1931

1,799,249

UNITED STATES PATENT OFFICE

LESLIE A. RIDDELL, OF WINNIPEG, MANITOBA, CANADA

BREAD-SLICING MACHINE

Application filed January 10, 1929. Serial No. 331,518.

The invention relates to improvements in bread slicing machines and an object of the invention is to provide a machine by the use of which one can easily and quickly cut a loaf of bread into slices and can vary the thickness of the slices cut as desired.

A further object is to provide a bread slicing machine wherein the feeding of the loaf is automatic and wherein pressure is automatically applied to hold the loaf during the interval that the cut is being made, such latter insuring of an even thickness of slice.

A further object of the invention is to construct the device in the form of a cabinet having storage compartments for several loaves of bread and a withdrawable tray for receiving the cut slices.

A still further object is to provide a cabinet with a hinged door carrying the tray and to construct the tray such that when the door is closed and the machine operated, the cut slices will be discharged into the tray and such that when the door is opened, the tray will withdraw from the cabinet with the door to expose the cut slices.

A further object of the invention is to construct the knife and the gauge plate associated therewith so that they can be readily removed without interfering with any other part of the machine and further such that the gauge plate can be readily adjusted in respect to the knife to vary the thickness of the slice cut.

With the above more important objects in view, the invention consists essentially in the arrangement and construction of parts hereinafter more particularly described, reference being had to the accompanying drawings, in which:—

Fig. 1 is a perspective view of the complete machine with the door open and the tray exposed.

Fig. 2 is a vertical sectional view at 2—2' Figure 1.

Fig. 3 is a horizontal sectional view at 3—3' Figure 2.

Fig. 4 is a vertical sectional view at 4—4' Figure 3.

Fig. 5 is a perspective view of part of the mechanism used for holding the loaf during the cut and releasing the same subsequent to the cut.

Fig. 6 is an enlarged detailed vertical sectional view through a part of the blade, gauge plate and other associated parts, the lower end of the shaft carrying the same being shown in side elevation.

Fig. 7 is a perspective view of the knife.

Fig. 8 is a perspective view of the tapering spring.

Fig. 9 is a perspective view of the gauge plate.

In the drawing like characters of reference indicate corresponding parts in the several figures.

The machine body is in the form of a substantially rectangular metallic cabinet 1 having the front side thereof open and provided with a closure door 2 hinged as indicated at 3 to one side of the cabinet. Suitable means can be employed for holding the door closed such as a hasp 4 and staple 5.

Interiorly the cabinet is provided with a lower shelf 6 spaced from the bottom of the cabinet to provide a receiving chamber 7 for a bread tray 8, the tray being permanently fastened to the inner side of the door in a location adjoining the lower edge thereof and being segmental in shape so that it will swing into and out of the cabinet when the door is closed or opened. Two vertical partitions 9 and 10 extend upwardly from the shelf 6 and have their upper ends terminating at a top shelf 11 disposed somewhat below the top of the cabinet. A transverse partition 12 also extends from the shelf 6 to that 11 and the shelves 6 and 7 are both cut away in advance of the partition 12 and between the partitions 9 and 10 so that there is formed by the partitions a vertically disposed receptacle 13 for a loaf of bread, the receptacle being positioned centrally at the front of the cabinet and the loaf of bread being entered through the cut away part of the upper shelf.

This receptacle opens through the bottom shelf to the compartment 7. A retaining plate 14 extends upwardly from the shelf 6 and holds the lower end of the entered loaf from escaping forwardly. Between the shelves 6 and 11, I locate further intermediate shelves 15 and 16 and obviously the various shelves provide ample support for several loaves of bread.

Centrally within the cabinet, I locate a vertical shaft 17 which has the upper end mounted in a suitable bearing 18 provided on the under side of the shelf 11 and the lower end passing rotatably through a bridge bar 19 secured to the partition 6. The shaft is to the rear of the partition 12 and it is supported by a washer or the like 20 resting centrally on the bridge bar 19 and fastened to the shaft by a cross pin 21. The lower end of the shaft which projects beneath the partition 6 is longitudinally slotted as indicated at 22 and has the lower extremity thereof screw threaded.

To the shaft I secure permanently in any suitable manner a bevel gear 23 which is continuously in mesh with a bevel pinion 24 permanently secured to the inner end of a tubular shaft 25 which is rotatably mounted in the partition 10 and a bearing 26 carried by the side wall of the cabinet. An opening 27 is provided in the cabinet at the outer end of the tubular shaft and a driving shaft 28 extends through the opening into the tubular shaft and has the inner end thereof notched as indicated at 29 to engage a cross pin 30 carried by the tubular shaft. The outer end of the driving shaft is fitted with a crank 31 carrying a hand grip or handle 32.

The latter arrangement permits one to withdraw the driving shaft and store it within the cabinet when the machine is not in use. Obviously when the handle is in place and one turns the crank by the handle, the vertical shaft 17 will be driven.

The lower end of the shaft 17 carries a knife or cutting blade 33 and a gauge plate 34. The knife blade is of the shape best shown in Figure 7 where it will be observed that it presents a sharpened cutting edge 35 which gradually increases in radius from the point 36 to that 37 and presents a right angled corner 38, the purpose of which will be later described. Centrally to the upper face of the knife blade, I secure permanently a hub 39 adapted to slidably receive the shaft 17 and the hub carries a cross pin 40 adapted to slidably enter the slot 22 of said shaft.

According to this arrangement, the knife is passed into position by sliding it upwardly on the shaft with the pin in the slot, the upper end of the slot limiting the uppermost position of the knife by contact with the pin. In this way, I avoid any possibility of the knife being jammed too tightly against the under face of the partition 6.

The gauge plate 34 is of the shape best shown in Figure 9 and at this point, I might mention that when the knife and the gauge plate are in the machine, they assume positions relative to one another approximately as shown in Figures 7 and 9 and it will be observed that the gauge plate is shaped to stop the falling loaf after the knife has cleared the cut and by so doing gauge the thickness of the slice to be subsequently cut, to support the uncut portion of the slice when the cut is being made and to permit the slice to clear to the tray immediately it is severed by the knife. The gauge plate is supplied with a hub 41 which carries a cross pin 42 adapted to enter the slot 22 and after the gauge plate has been placed on the shaft 17 it is held thereon by an adjusting nut 43 screw threading onto the lower end of the shaft and engaging the hub of the gauge plate.

A tapering spring 44 is interposed between the gauge plate and the knife, such spring acting to hold the knife in its uppermost position with the pin 40 engaging the upper end of the slot and the gauge plate in any desired position in relation to the knife depending on the adjustment given the nut 43. In other words, by adjusting the nut 43, one varies the thickness of the slice which the machine will cut.

To make the above clearer, I might explain that the loaf of bread is placed in the receptacle 13 in an upstanding position and will rest with the lower end thereof on the gauge plate and accordingly when the crank 31 is turned, the knife will cut a slice the thickness of which will be gauged by the distance which the blade and the gauge plate are apart. Throughout the entire operation of cutting the loaf rests on the gauge plate and the instant the slice is severed, it falls to the tray through the open area reserved between the radial edge 45 of the gauge plate and the rear extremity 46 of the finger like end 34' of the gauge plate.

It is very desirable to hold the loaf of bread firmly during the interval that the slice is being cut and to release it to drop to the gauge plate immediately after the cut is made and to this end, I provide a vertically disposed pressure plate 47 located within the receptacle 13 and presenting transverse and forwardly directed wings 48 and 49. The pressure plate is suspended for lateral movement within the receptacle 13 and is normally held pressed towards the partition or wall 9. The rear wall of the cabinet is reinforced by an interior plate 50 and to this plate in a location between the partitions 9 and 10, I attach by hinges a pair of forwardly extending, equal length arms 51 and 52 which arms span the shaft 17 and have their forward ends hingedly connected to a cross bar 53.

The forward ends of the arms extend through a suitable cross slot 54 provided in the partition 12, the bar 53 entering the receptacle 13 and the transverse wing of the pressure plate is suitably attached to the cross bar 53. A coiled spring 55 is connected to the arm 52 and to the plate 50 and serves to continuously press the pressure plate towards the partition 9, the movement of the plate in such direction being stopped by engagement of the edge of the wing 48 with such partition.

Obviously if a loaf of bread be inserted in the receptacle 13 between the wing 49 and the partition 9, it will be firmly held between such parts. I find it desirable to place the flat base of the loaf against the partition 9. This pressure plate serves to hold the loaf firmly during the time that the slice is being cut and obviously the pressure plate will move back to accommodate various sized loaves.

It is necessary to relieve the pressure of the pressure plate on the loaf after the slice is cut to permit the loaf to drop down onto the gauge plate and this is accomplished by securing a cam or striker arm 56 to the shaft 17 in a proper location and attaching to the arm 52 a trip member 57 herein shown as in the form of a roller.

The striker is positioned on the shaft in respect to the cutting blade such that the pressure plate will be forced back far enough to release the inserted loaf to drop prior to the starting of the cut and such that the striker will be clear of the roller at the time the cut starts, such latter insuring that the loaf is held firmly at such time. As before stated, the distance the loaf is permitted to drop governs the thickness of the slice cut and such is controlled by the distance which the gauge plate is away from the cutting knife. This distance can be set as desired by manipulating the nut 43.

From the above it will be apparent that I have devised a cabinet in which bread can be conveniently stored and by the use of which a loaf of bread can be quickly and evenly sliced to any desired thickness and the slices caught in a tray which latter can be swung out with the door to facilitate removal of the cut slices.

Whilst I have described the invention as utilized for slicing a loaf of bread, it is to be understood that it can be used with equal facility for slicing other produce.

What I claim as my invention is:—

1. In a commodity slicing machine, in combination, a vertically disposed shaft having the lower end thereof screw threaded and longitudinally slotted, a cutting knife mounted on the shaft to rotate therewith and presenting a spiralling cutting edge, a gauge plate located beneath the cutting knife and provided with a hub mounted for endwise sliding movement on the shaft, a pin carried by the hub and entering the slot in the shaft, a spring interposed between the gauge plate and the knife and surrounding the shaft and an adjusting nut screw threading on the lower end of the shaft and engaging the under side of the gauge plate hub.

2. In a commodity slicing machine, a vertically disposed open bottomed receptacle for receiving the commodity to be sliced, a vertically disposed pressure plate located within the receptacle and normally yieldingly engaging the commodity to hold the same, a rotating knife for slicing the lower end of the commodity, a rotating gauge plate located below the knife and means operating in conjunction with the knife to release the pressure plate from the commodity to permit the commodity to gravitate to the gauge plate prior to the knife engaging the commodity.

3. In a commodity slicing machine, a vertically disposed open bottomed receptacle for receiving the commodity to be sliced, a vertically disposed pressure plate located within the receptacle, a pair of swinging arms pivotally supporting the plate for swinging movement in a direction towards and away from the commodity, spring means operating to press the plate against the commodity to hold the latter, a rotating knife for slicing the lower end of the commodity, a rotating gauge plate located below the knife and means operating in conjunction with the knife to press the pressure plate away from the commodity to permit the commodity to gravitate to the gauge plate prior to the knife engaging the commodity.

4. In a commodity slicing machine, a cabinet, a vertically disposed open bottomed receptacle for receiving the commodity to be sliced, the receptacle being in the forward part of the cabinet, a vertically disposed pressure plate located within the receptacle, a pair of horizontally disposed spaced parallel swinging arms having their rear ends pivotally secured to the back wall of the cabinet and their forward ends pivotally attached to the pressure plate, said arms passing through a slot provided in the back wall of the receptacle, a spring operating in conjunction with the arms to press the pressure plate towards the commodity to hold the same, a vertically disposed rotatably mounted shaft located centrally of the cabinet to the rear of the receptacle, said shaft passing between the arms aforesaid, means operable from the exterior of the cabinet for driving the shaft, a rotating knife secured to the shaft for slicing the lower end of the commodity, a gauge plate secured to the shaft beneath the knife and adapted to support the commodity subsequent to a cut being made by the knife and a cam secured to the shaft and engageable with one of the arms to move the same in a direction to release the pressure plate from the commodity and permit the commodity to gravitate to the gauge plate prior to the knife engaging the commodity.

Signed at Winnipeg, this 7th day of December, 1928.

LESLIE A. RIDDELL.